United States Patent
Hirsch et al.

(10) Patent No.: US 9,936,516 B2
(45) Date of Patent: Apr. 3, 2018

(54) TRANSMISSION COORDINATION FOR COLLOCATED RADIOS

(71) Applicant: QUALCOMM Incorporated, San Diego, CA (US)

(72) Inventors: Olaf Josef Hirsch, Sunnyvale, CA (US); Guido Robert Frederiks, Aptos, CA (US); Jibing Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 191 days.

(21) Appl. No.: 14/509,179

(22) Filed: Oct. 8, 2014

(65) Prior Publication Data

US 2016/0105902 A1    Apr. 14, 2016

(51) Int. Cl.
*H04B 7/24* (2006.01)
*H04W 72/12* (2009.01)
(Continued)

(52) U.S. Cl.
CPC .......... *H04W 72/121* (2013.01); *H04B 7/024* (2013.01); *H04W 72/1215* (2013.01); *H04W 72/1247* (2013.01); *H04W 28/065* (2013.01)

(58) Field of Classification Search
CPC ............. H04W 72/1215; H04W 68/12; H04W 72/10; H04W 92/02
See application file for complete search history.

(56) References Cited

U.S. PATENT DOCUMENTS 8,139,593 B2 * 3/2012 Dravida ................. H04L 47/14
                                                                  370/351
8,559,881 B2   10/2013 Walley et al.
(Continued)

FOREIGN PATENT DOCUMENTS

WO    WO-2009013238 A1    1/2009
WO    WO-2013048512 A1    4/2013

OTHER PUBLICATIONS

ISA/EPO, Partial Search Report of the International Searching Authority, Int'l. App. No. PCT/US2015/048530, Dec. 1, 2015, European Patent Office, Rijswijk, NL, 5 pgs.
(Continued)

*Primary Examiner* — Ayaz Sheikh
*Assistant Examiner* — Debebe Asefa
(74) *Attorney, Agent, or Firm* — Holland & Hart LLP/Qualcomm

(57) ABSTRACT

Methods, systems, and devices are described for wireless communication at a wireless device having collocated radios employing different radio access technologies (RATs). For example, a second radio of the wireless device may receive a first scheduling message. The first scheduling message may include information relating to timing, priority, transmission power, and radio capabilities. Using this scheduling message, a determination of whether a first radio employing a first RAT and the second radio employing a second RAT can transmit in parallel may be made. A first transmission on the first radio may be coordinated with a second transmission on the second radio based on the determination of whether the first radio and the second radio can transmit in parallel. A number of data units may be aggregated into an aggregate frame to be transmitted by the second radio. The number of data units may be based on the scheduling message.

30 Claims, 11 Drawing Sheets

(51) Int. Cl.
H04W 28/06 (2009.01)
H04B 7/024 (2017.01)

(56) References Cited

U.S. PATENT DOCUMENTS

| | | | |
|---|---|---|---|
| 8,606,184 | B1 | 12/2013 | Luthra |
| 9,219,563 | B2 * | 12/2015 | Smadi .................. H04J 11/0023 |
| 2009/0238158 | A1 | 9/2009 | Lewis |
| 2013/0058316 | A1 | 3/2013 | Hirsch et al. |
| 2013/0155931 | A1 | 6/2013 | Prajapati et al. |
| 2013/0225100 | A1 | 8/2013 | Chen et al. |
| 2013/0244709 | A1 * | 9/2013 | Davydov .......... H04W 72/0413 455/501 |
| 2014/0341100 | A1 * | 11/2014 | Sun et al. ..................... 370/311 |

OTHER PUBLICATIONS

ISA/EPO, International Search Report and Written Opinion of the International Searching Authority, Int'l. App. No. PCT/US2015/048530, Feb. 9, 2016, European Patent Office, Rijswijk, NL, 16 pgs.

* cited by examiner

TRANSMISSION COORDINATION FOR COLLOCATED RADIOS

BACKGROUND

The following relates generally to wireless communication, and more specifically to techniques for coordinating wireless transmissions by collocated radios in a wireless device.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power).

A wireless communications network may include a number of network devices, e.g., an access point (AP), that can support communication for a number of wireless devices. A wireless device may communicate with a network device bi-directionally. For example, in a wireless local area network (WLAN), a station (STA) may communicate with an associated AP via downlink and uplink. The downlink (or forward link) refers to the communication link from the AP to the station, and the uplink (or reverse link) refers to the communication link from the station to the AP.

In many cases, a wireless device may have multiple coexisting radios for different radio access technologies (RATs). For example, a wireless device may use one radio to send and receive WLAN communications and another radio to send and receive Bluetooth (BT) communications. The close proximity of the radios to each other may result in unwanted interference, especially when both of the radios are operating at the same time. This interference may be exacerbated if the radios operate in overlapping radio frequency spectrum bands. Nevertheless, there may be occasions during which one radio may have data to transmit at a time when another radio is scheduled to receive a transmission. In such cases, it may be useful to have an efficient and effective scheme for resolving and avoiding conflicts between the different radios.

SUMMARY

The described features generally relate to techniques for coordinating wireless transmissions by coexisting radios in a wireless device. For example, a second radio employing a second RAT may receive a first scheduling message from a first radio employing a first radio access technology (RAT). Based on the scheduling message, a determination may be made whether the first radio and the second radio can transmit in parallel (i.e., concurrently), and a first transmission on the first radio may be coordinated with a second transmission on the second radio based at least in part on the determination. The determination of whether the transmissions can occur in parallel may be based at least in part on a respective priority assigned to each of the transmissions.

If it is determined that the first and second transmissions can occur in parallel, the coordination of the transmissions may include dynamically adjusting transmission power levels at the first and/or second radios to reduce cross-interference during the parallel transmission. The amount by which each radio reduces transmission power may be based at least in part on the respective priority assigned to each transmission or another factor. In other examples, if it is determined that the first and second transmissions cannot occur in parallel, coordinating the communication may include adapting a frame size or a timing of the first or second transmission to prevent the interference associated with a parallel transmission.

In some examples, a method for wireless communication with a device including a first radio employing a first radio access technology (RAT) collocated with a second radio employing a second RAT includes receiving a first scheduling message at the second radio, determining a transmission window for the second radio based at least in part on the first scheduling message, adding data units to an aggregated frame, wherein a number of the data units is based at least in part on a size of the transmission window, and transmitting the aggregated frame during the transmission window.

In some examples, a method for wireless communication with a device including a first radio employing a first radio access technology (RAT) collocated with a second radio employing a second RAT includes receiving a first scheduling message at the second radio, determining whether the first radio and the second radio can transmit in parallel based at least in part on the first scheduling message, and coordinating a first transmission on the first radio with a second transmission on the second radio based at least in part on the determination.

In some examples, an apparatus for wireless communication including a first radio employing a first radio access technology (RAT) collocated with a second radio employing a second RAT includes means for receiving a first scheduling message at the second radio, means for determining whether the first radio and the second radio can transmit in parallel based at least in part on the first scheduling message, and means for coordinating a first transmission on the first radio with a second transmission on the second radio based at least in part on the determination.

In some examples, an apparatus for wireless communication includes a first radio employing a first radio access technology (RAT), a second radio employing a second RAT to receive a first scheduling message, wherein the second radio is collocated with the first radio, and a communication manager to: determine whether the first radio and the second radio can transmit in parallel based at least in part on the first scheduling message, and coordinate a first transmission on the first radio with a second transmission on the second radio based at least in part on the determination.

In some examples, a non-transitory computer readable medium stores computer-executable code for wireless communication in a device including a first radio employing a first radio access technology (RAT) collocated with a second radio employing a second RAT. The code may be executable by a processor to receive a first scheduling message at the second radio, determine whether the first radio and the second radio can transmit in parallel based at least in part on the first scheduling message, and coordinate a first transmission on the first radio with a second transmission on the second radio based at least in part on the determination.

In some cases, the data units include a unit from the group consisting of: a media access control (MAC) protocol data unit (MPDU), a MAC service data unit (MSDU), a filler data unit, and combinations thereof. The aggregated frame may include a frame from the group consisting of: an aggregated MPDU (A-MPDU), and aggregated MSDU (A-MSDU), and combinations thereof. In some cases, adding the data units to the aggregated frame is further based on a parameter from the group consisting of: a size of the data units, a modulation rate, and combinations thereof.

Various examples of the methods, devices, and/or non-transitory computer readable medium may includes the features of, means for, modules for, and/or processor-executable code for transmitting to the first radio a second scheduling message, the second scheduling message including a parameter from the group consisting of: a transmission power of the second transmission, a priority of the second transmission, and combinations thereof. Coordinating the first transmission on the first radio with the second transmission on the second radio may include delaying the first transmission from the first radio based at least in part on the second scheduling message. In some cases, coordinating the first transmission on the first radio with the second transmission on the second radio may include adapting a transmission power in response to determining that the first radio and the second radio can transmit in parallel, wherein the power is one of the group consisting of: a transmission power of the first radio, a transmission power of the second radio, and combinations thereof. In some cases, adapting the transmission power includes reducing the transmission power to meet a power constraint for parallel transmission. Coordinating the first transmission on the first radio with the second transmission on the second radio may include adapting a frame size of the second transmission in response to determining that the first radio and the second radio cannot transmit in parallel.

In some cases, coordinating the first transmission on the first radio with the second transmission on the second radio includes delaying the second transmission from the second radio based at least in part on the received first scheduling message. The determination may be based at least in part on a relative priority of the first transmission with respect to the second transmission. In some cases, the determination is based at least in part on a transmission power, wherein the transmission power is one of the group consisting of: the first radio, the second radio, and combinations thereof. The first scheduling message may include a parameter from the group consisting of: timing information for the first transmission, a priority of the first transmission, a transmission power of the first transmission, and combinations thereof.

In some cases, coordinating the first transmission on the first radio with the second transmission on the second radio includes refraining from transmitting the second transmission from the second radio in response to receiving the first scheduling message at the second radio prior to an expiration of a counter at the second radio. The first radio may include a Bluetooth radio and the second radio may include a wireless local area network (WLAN) radio.

Further scope of the applicability of the described methods and apparatuses will become apparent from the following detailed description, claims, and drawings. The detailed description and specific examples are given by way of illustration only, since various changes and modifications within the scope of the description will become apparent to those skilled in the art.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
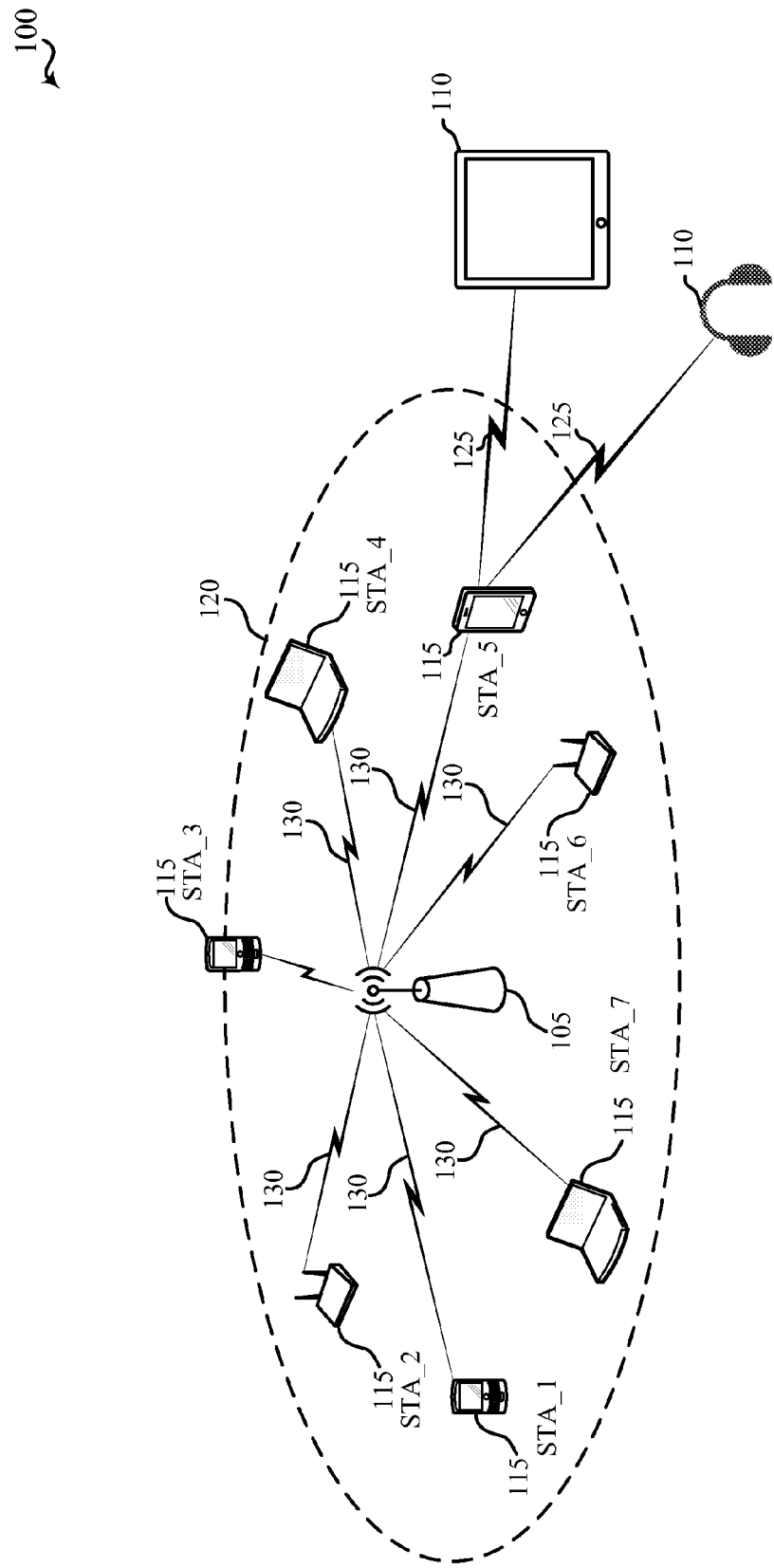
FIG. 1 illustrates an example of a wireless communications system in accordance with various examples.

The described features generally relate to one or more improved systems, methods, and/or apparatuses for wireless communication. As described above, a wireless device may have multiple coexisting radios for different radio access technologies (RATs). For example, a wireless device may use one radio to send and receive WLAN communications and another radio to send and receive Bluetooth (BT) communications. The close proximity of the radios to each other may result in unwanted interference, especially when both of the radios are operating at the same time. In some cases, a transmission from a first radio may be prevented or compromised based on a transmission of a second radio. In order to effectively communicate using multiple radios a scheduling message may be used by, or communicated between, radios.

The scheduling message may include timing information, transmission priorities, transmission powers, and/or radio capabilities. A second radio may use the scheduling message to determine if it is possible to communicate in parallel with a first radio. In response to this determination, the second radio may adjust one or more transmission parameters, such as a transmission power or frame size of the second radio. Additionally or alternatively, the second radio may delay or otherwise adapt the timing of a transmission, based on the scheduling message. In some examples, a second scheduling message in response to the first scheduling message may be received by the first radio, and the first radio may adapt one or more transmission parameters based at least in part on the second scheduling message.

In some examples, the first scheduling message may be used to determine a transmission and/or reception window, which may include a transmission start time, transmission end time, reception start time, reception end time, gap start time, and/or gap end time. In some cases, the second radio may transmit data units such as media access control (MAC) protocol data units (MPDUs) and/or MAC service data units (MSDUs). A number of data units may be aggregated into an aggregate frame, such as an aggregated MPDU (A-MPDU) or an aggregated MSDU (A-MSDU). The number of data units to aggregate into an aggregate frame may be determined based on the first scheduling message, such as based on the transmission and/or reception window. For example, an A-MPDU may include up to as many MPDUs as can be transmitted during a transmission window.

The following description provides examples, and is not limiting of the scope, applicability, or configuration set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to certain examples may be combined in other examples.

FIG. 1 illustrates a wireless local area network (WLAN) 100 (also known as a wireless fidelity (Wi-Fi) network) configured in accordance with various examples. The WLAN 100 includes an access point (AP) 105 and multiple associated stations 115. In this example, there are shown seven (7) stations or STAs 115, which are identified as station STA_1, STA_2, STA_3, STA_4, STA_5, STA_6, and STA_7. The WLAN 100, however, may have more or fewer stations 115 than those shown in FIG. 1 since the number shown is simply for illustrative purposes. The AP 105 and the associated stations 115 may represent a basic service set (BSS) or an extended service set (ESS). The various stations 115 in the network are able to communicate with one another through the AP 105. Also shown is a coverage area 120 of the AP 105, which may represent a basic service area (BSA) of the WLAN 100. Although not shown in FIG. 1, an extended network base station associated with the WLAN 100 is typically connected to a wired or wireless distribution system (DS) that may allow multiple APs 105 to be connected in an ESS.

The AP 105 may be configured to communicate bi-directionally with each of the stations 115 using WLAN communication links 130. The WLAN communication links 130 may include downlink transmissions (e.g., beacon frames) that are sent from the AP 105 to a station 115 as well as uplink transmissions (e.g., acknowledgement (ACK) frames) that are sent from a station 115 to the AP 105. Typically, the AP 105 is configured to broadcast its downlink transmissions to the stations 115 that are within the coverage area 120.

In some cases, a station 115, such as STA_5, may further communicate over non-WLAN communication links 125 with non-WLAN devices 110 outside of the WLAN 100 using a second radio, such as a Bluetooth, cellular, or other non-WLAN radio. As used herein, the term "non-WLAN device" does not necessarily mean a device that is incapable of communicating over WLAN; rather a "non-WLAN device" is simply a device with which the station 115 communicates wirelessly using a radio access technology other than a WLAN protocol. In some cases, the non-WLAN device 110 is another station 115. The non-WLAN communication links 125 may use neighboring or overlapping radio frequency spectrum bands for communication as the WLAN communication links 130. In some cases, the non-WLAN communication links 125 may interfere with the WLAN communication links 130. Further, the non-WLAN communication links 125 and the WLAN communication links 130 may use similar resources, such as hardware (e.g., power amplifier) or scheduled system resources, and communication using both the non-WLAN communication links 125 and the WLAN communication links 130 may compromise overall system performance.

STA_5 115 may manage its communications across multiple radios, such as a radio for WLAN communications links 130 and a radio for non-WLAN communication links 125. For example, the radios may communicate with each other using scheduling messages to determine whether parallel transmissions are scheduled, and if so, whether parallel transmissions are possible. Based on these determinations, transmissions by the radios may be coordinated to avoid interfering with or overpowering one another such as by adapting a transmission power of a communication, delaying transmission of a communication, and/or adapting a frame size of a communication.

Figure 2:
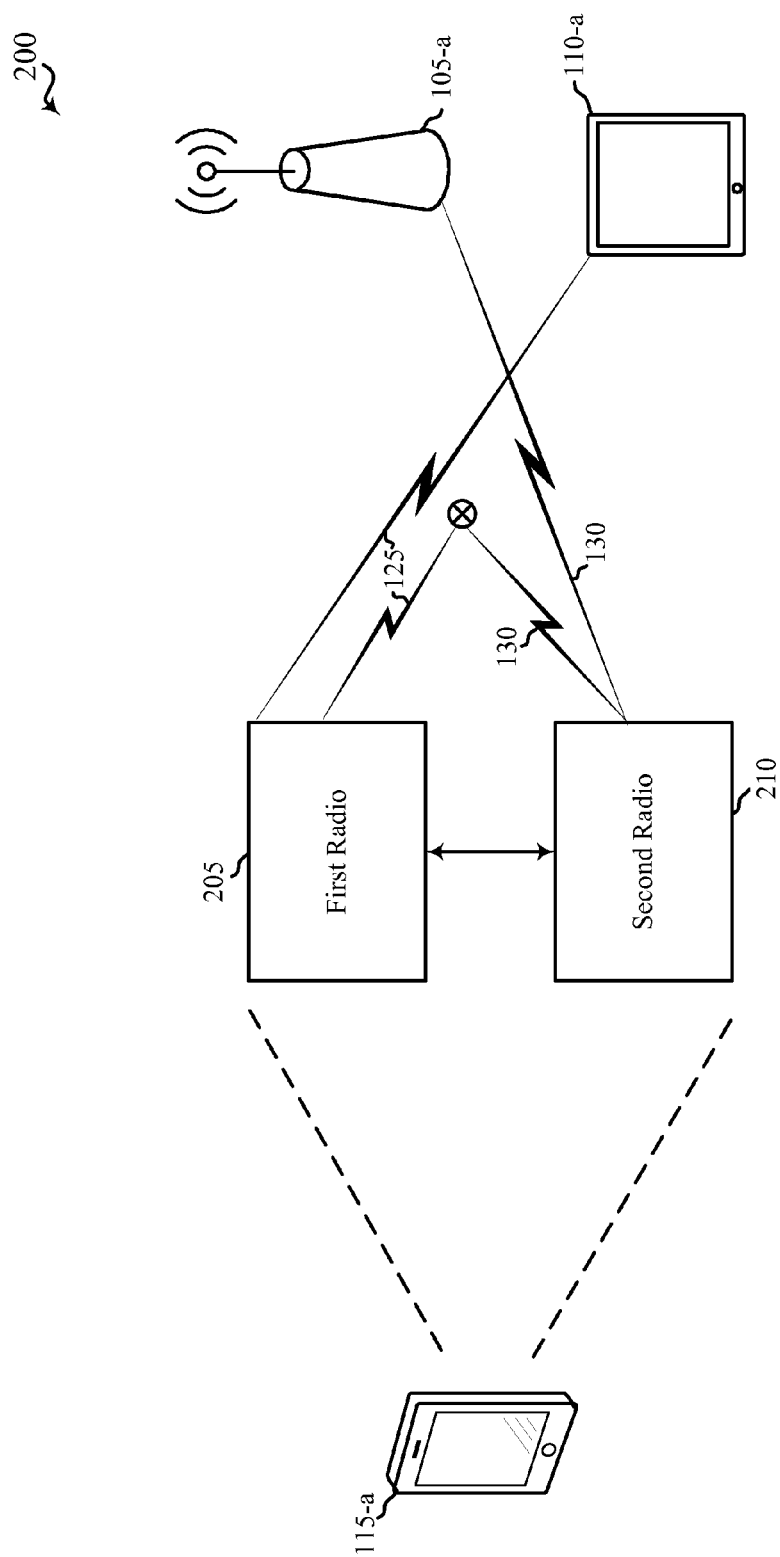
FIG. 2 illustrates an example of a wireless communications system in accordance with various examples.

FIG. 2 illustrates an example of a wireless communication system 200 for wireless communication in accordance with various examples. The wireless communication system 200 includes a station 115-a, an AP 105-a, and a non-WLAN device 110-a. The station 115-a may be an example of the stations 115 of FIG. 1. The AP 105-a may be an example of the AP 105 of FIG. 1. The non-WLAN device 110-a may be an example of one or more of the non-WLAN devices 110 of FIG. 1.

The station 115-a may include a first radio 205 and a second radio 210. The first radio 205 and the second radio 210 may communicate using similar or different technologies and/or frequencies. The first radio 205 may employ a first radio access technology (RAT) and the second radio 210 may employ a second RAT. In some cases, the first radio 205 is a Bluetooth, cellular, or other non-WLAN radio and the second radio 210 may be a WLAN radio. For example, the first radio 205 may communicate with the non-WLAN device 110-a using non-WLAN communication links 125, while the second radio 210 may communicate with the AP 105-a using WLAN communication links 130. The first radio 205 and second radio 210 may be in communication with one another.

The first radio 205 and second radio 210 may use neighboring or overlapping radio frequency bands to send and receive wireless transmissions. In some cases, the non-WLAN communication links 125 of the first radio 205 and the WLAN communication links 130 of the second radio 210 may interfere with one another. If the communications experience interference it may prevent some of all of the communicated information from reaching the target AP 105-a and/or non-WLAN device 110-a. In some examples, concurrent reception and transmission by the first radio 205 and the second radio 210 may suppress a signal. If the first radio 205 is transmitting a signal using a non-WLAN communication link 125 while the second radio 210 is attempting to receive a signal using a WLAN communication link 130, the transmitting non-WLAN communication link 125 may drown out the receiving WLAN communication link 130 making WLAN reception difficult or improbable.

The station 115-a may determine whether the first radio 205 and second radio 210 can perform parallel communications (e.g., concurrent transmission and/or reception). The first radio 205 and the second radio 210 may exchange a message which may be used to help determine whether parallel communications are likely to cause performance degradation. The message may include information relating to the non-WLAN communication links 125 and/or the WLAN communication links 130 such as a frequency, timing, or power of a transmission, and/or capabilities of the first radio 205 and/or second radio 210 (e.g., parallel transmission/reception capabilities and/or constraints). For example, the first radio 205 and/or second radio 210 may indicate that parallel communications for some operations (e.g., transmissions, receptions, frequency bands, types of communications, etc.) are likely to cause a reduction in performance. The determination may be made semi-statically or dynamically (e.g., as upcoming transmissions and/or receptions are scheduled).

In some cases, the station 115-a may identify communications from the first radio 205 and second radio 210 that are scheduled to occur in parallel and determine whether the parallel communications are likely to cause inter-radio interference. For example, if the communications occur on distinctly different frequencies, it may be unlikely that inter-radio interference will occur. The difference between transmission frequencies of the first radio 205 and the second radio 210 may be compared to a frequency difference threshold when determining whether parallel transmissions are likely to cause interference. The frequency difference threshold may be a predetermined or variable threshold (e.g., included in the message, determined based on channel conditions, set by the wireless communication system 200, etc.). Additionally or alternatively, whether parallel communications are likely to cause inter-radio interference may depend on timing of transmission and/or reception by the radios. In some cases, the station 115-a may determine that parallel communications are unlikely to cause interference if the timing of the first radio 205 and the second radio 210 is appropriate, such as both radios transmitting or receiving at the same time or at different times. In some cases, whether parallel communications are likely to cause performance degradation may be based on power constraints of the station 115-a. For example, if the combined power of transmissions from the first radio 205 and the second radio 210 exceeds a power threshold, parallel transmission may degrade the signal quality of one or more of the parallel transmissions.

Where the station 115-a identifies scheduled parallel communications that, based on the parallel communication capabilities and constraints of the radios, are unlikely to cause performance degradation, the station 115-a can perform the parallel communications as scheduled. Where parallel communications that are likely to cause performance degradation are identified (e.g., based on a frequency, timing, or power of a communication, etc.), the station 115-a may coordinate communications between the first radio 205 and the second radio 210 to avoid the scheduled parallel communication or to improve the performance of the parallel communication. In some examples, communication parameters (e.g., timing, frame size, etc.) for one or more communications by the second radio 210 may be altered such that they do not overlap in time with communication operations (e.g., transmissions and/or receptions) by the other radio. For example, if a combined power of transmissions from the first radio 205 and the second radio 210 exceeds a power threshold, the transmission by the second radio 210 may be delayed such that it does not overlap in time with the transmission by the first radio 205.

Alternatively, the station 115-a may alter one or more operations of the scheduled parallel communications by the first radio 205 or the second radio 210 such that performance of the parallel communication is improved. The station 115-a may adjust timing of a transmission or a frame size to improve the performance for parallel communication. In some instances, transmission periods for one or more of the radios may be followed by periods of reception of information (e.g., responses, acknowledgements, etc.). Where, for example, a reception period for the second radio 210 begins during an on-going transmission period of the first radio 205, interference may degrade performance for the reception by the second radio 210. The station 115-a may delay the transmission period by the second radio 210 or adjust a frame size of the transmission, so that the transmission period aligns with (e.g., ends concurrently with, etc.) the transmission period for the first radio 205. Thus, while the transmissions by the first radio 205 and the second radio 210 may still be performed concurrently, the transmission period of the second radio 210 may be altered such that the following reception period for the second radio 210 is not concurrent with the transmission period of the first radio 205. Adapting communications for reception periods following transmission periods is merely one example and other communications by the first radio 205 and second radio 210 may be identified that result in parallel communication operations that violate one or more parallel operation constraints of the first radio 205 and/or second radio 210. Additionally or alternatively, the station 115-a may reduce the power of a transmission to allow for parallel transmission or reception by the other radio. By coordinating the communications where parallel communications may cause performance degradation, the station may make efficient and reliable use of the spectrum available.

Figure 3A:
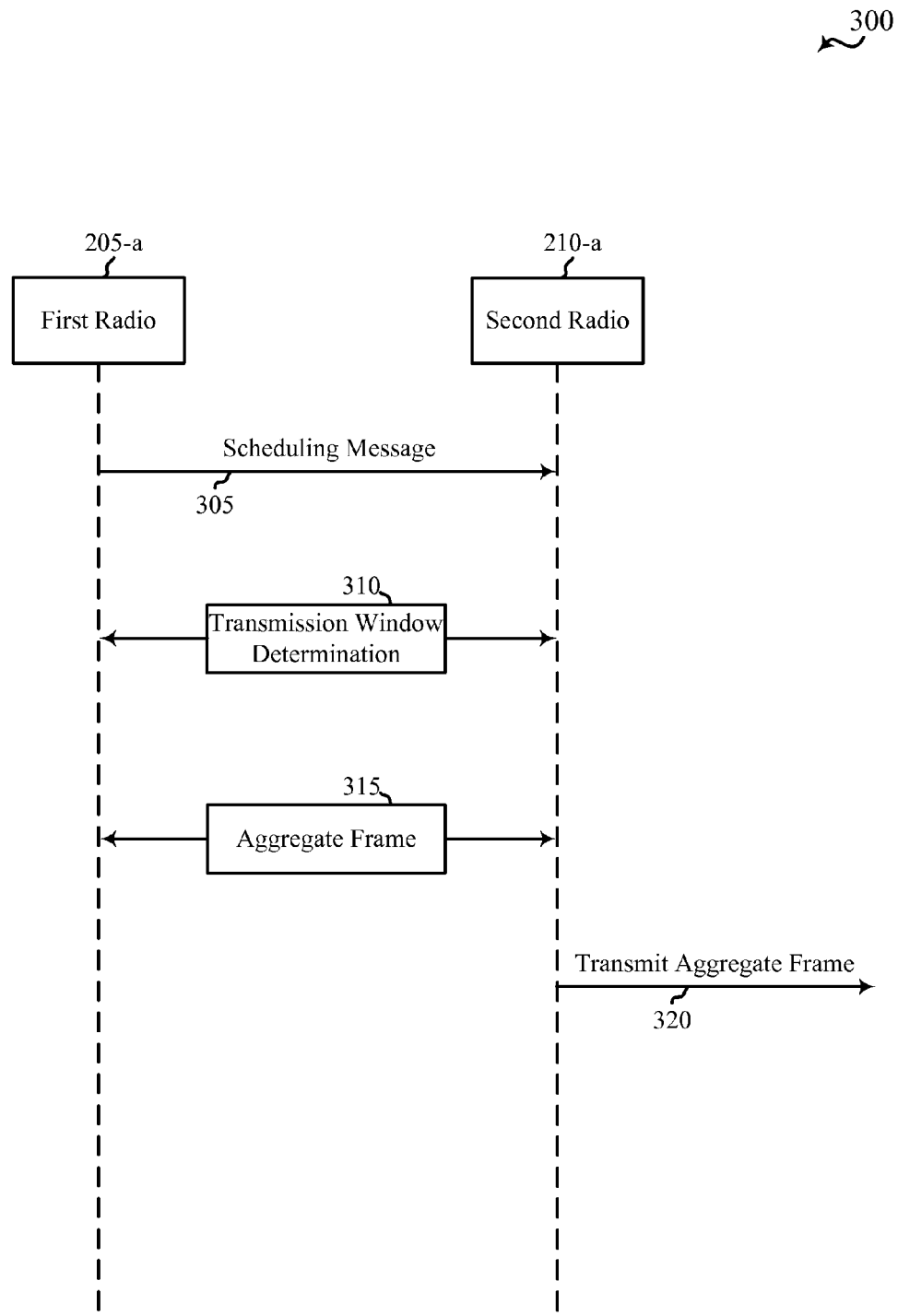
FIG. 3A shows a call flow diagram that illustrates an example of frame aggregation by collocated radios in a wireless device in a wireless communications system in accordance with various examples.

FIG. 3A illustrates a call-flow diagram 300, which illustrates, according to some examples, communication within a system configured for wireless communication. FIG. 3A shows communication between a first radio 205-a and a second radio 210-a. The first radio 205-a may be an example of the first radio 205 of FIG. 2. The second radio 210-a may be an example of the second radio 210 of FIG. 2.

The second radio 210-a may receive a first scheduling message 305 from the first radio 205-a. The first scheduling message 305 may include information relating to an upcoming transmission from the first radio 205-a. For example, the first scheduling message may include timing information, a priority, and/or a transmission power of the upcoming transmission from the first radio 205-a. The first scheduling message 305 may include information relating to radio capabilities, such as whether parallel transmission and/or reception can occur. In some cases, if the first scheduling message 305 is received at the second radio 210-a before a backup counter expires, the second radio 210-a may refrain from transmitting the upcoming transmission from the second radio 210-a.

The first radio 205-a, the second radio 210-a, a station 115, an AP 105, and/or some other network component may determine a transmission window 310, such as based on the first scheduling message 305. Determining a transmission window 310 may include determining a number of boundaries, such as a transmit start time, a transmit end time, a receive start time, a receive end time, a gap start time, and a gap end time. The determined boundaries may be related to the first radio 205-a and/or the second radio 210-a. In some cases, determining a transmission window 310 may be based on the first scheduling message 305, such as based on at least one of timing information, a priority, a transmission power, and/or radio capabilities, such as whether parallel transmission and/or reception can occur.

The first radio 205-a, the second radio 210-a, a station 115, an AP 105, and/or some other network component may aggregate a frame 315. An aggregated frame may include a number of data units. In some cases, data units may include media access control (MAC) protocol data units (MPDUs), MAC service data units (MSDUs), and/or filler data units (i.e., data units which do not contain data but which add to the length of the aggregated frame, such as to align reception with a reception window). Aggregated MPDUs may be referred to as A-MPDUs and aggregated MSDUs may be referred to as A-MSDUs. In some cases, a number of data units is determined which is based on the determined transmission window 310, or a determined reception window. In some examples, a number of data units is further based on a size of the data units and/or a modulation rate. For example, an A-MPDU may include up to as many MPDUs as can be transmitted during a transmission window. In some examples, an A-MSDU may include up to as many MSDUs as can be transmitted while still receiving a response (e.g., block acknowledgment (B-ACK), etc.) during a response window. In some cases, data units may be transmitted on their own. By aggregating data units together, overhead (e.g., headers, MAC frame fields, interframe spacing, acknowledgment of transmitted frames, etc.) may be reduced while increasing throughput by transmitting a number of data units based on the timing of the first radio 205-$a$.

The second radio 210-$a$ may transmit the aggregate frame 320. The aggregate frame may be transmitted 320 during a determined transmission window. In some examples, the aggregate frame is transmitted to an AP 105 or another station 115.

Figure 3B:
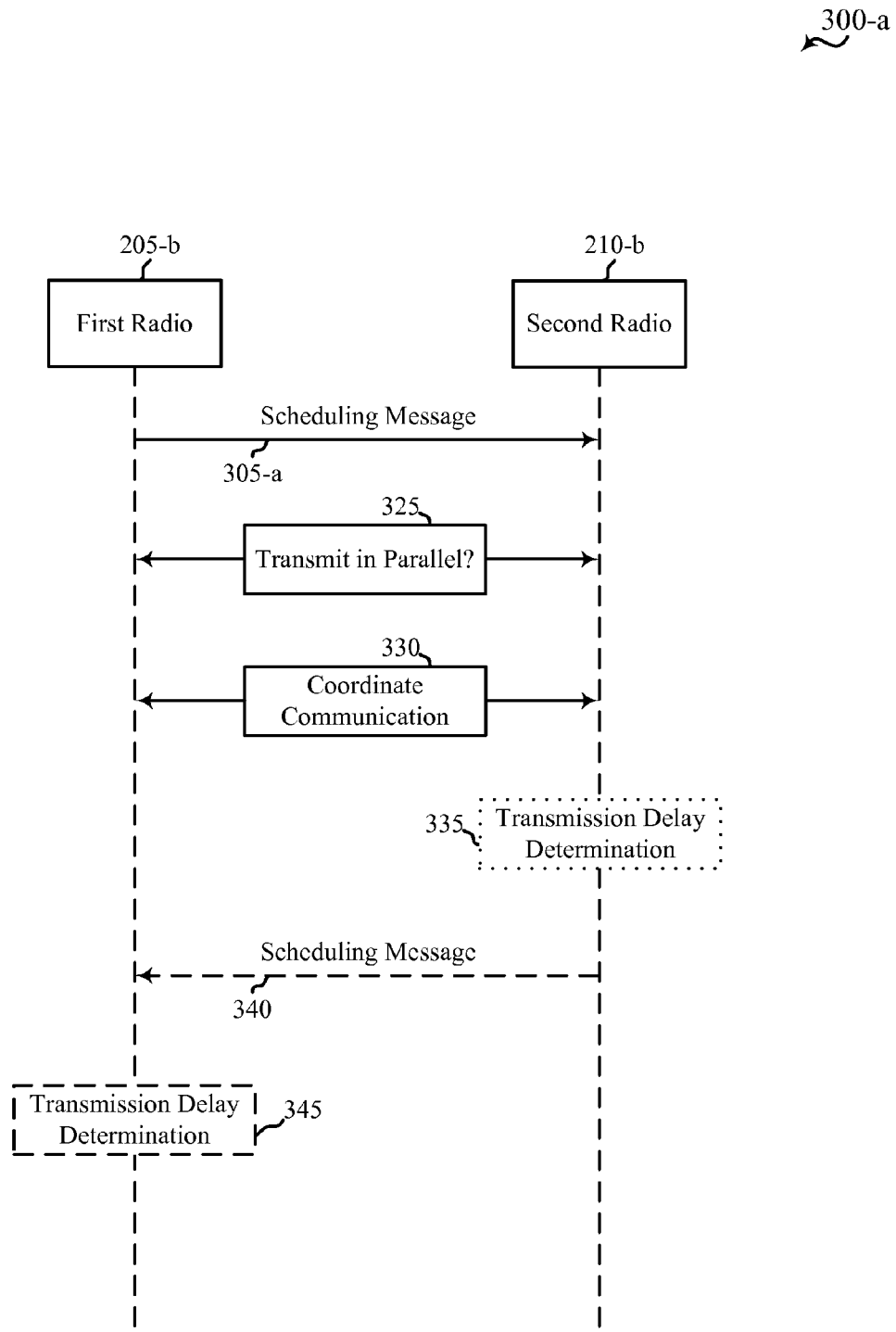
FIG. 3B shows a call flow diagram that illustrates an example of coordinating wireless transmissions by collocated radios in a wireless device in a wireless communications system in accordance with various examples.

FIG. 3B illustrates a call-flow diagram 300-$a$, which illustrates, according to some examples, communication within a system configured for wireless communication. FIG. 3B shows communication between a first radio 205-$b$ and a second radio 210-$b$. The first radio 205-$b$ may be an example of the first radio 205 of FIG. 2. The second radio 210-$b$ may be an example of the second radio 210 of FIG. 2.

The second radio 210-$b$ may receive a first scheduling message 305-$a$ from the first radio 205-$b$. The first scheduling message 305-$a$ may include information relating to an upcoming transmission from the first radio 205-$b$. For example, the first scheduling message may include timing information, a priority, and/or a transmission power of the upcoming transmission from the first radio 205-$b$. The first scheduling message 305-$a$ may include information relating to radio capabilities, such as whether parallel transmission and/or reception can occur. In some cases, if the first scheduling message 305-$a$ is received at the second radio 210-$b$ before a backup counter expires, the second radio 210-$b$ may refrain from transmitting the upcoming transmission from the second radio 210-$b$.

The first radio 205-$b$, the second radio 210-$b$, a station 115, an AP 105, and/or some other network component may determine whether the first radio 205-$b$ and the second radio 210-$b$ can transmit in parallel 325, such as based on the first scheduling message 305-$a$. In some cases, determining whether parallel transmission can occur is based on a relative priority of the upcoming transmission from the first radio 205-$b$ with respect to an upcoming transmission from the second radio 210-$b$. For example, if an upcoming transmission from the first radio 205-$b$ is low priority compared to the upcoming transmission from the second radio 210-$b$, transmission may occur in parallel. In some cases, the transmissions of the first radio 205-$b$ are generally prioritized over the transmissions of the second radio 210-$b$.

Determining whether parallel transmission can occur may be based on a transmission power, such as a transmission power of the first radio, a transmission power of the second radio, and/or some combination of the two. For example, parallel transmission may occur if one or both upcoming transmissions are of sufficiently low power. In some cases, radio capabilities and/or settings are taken into account when determining whether parallel transmissions may occur. For example, some radios have concurrent transmission and/or reception capabilities while others do not. If radios such as the first radio 205-$b$ and the second radio 210-$b$ have concurrent transmission capabilities, timing parameters (e.g., timing of the upcoming transmission from the second radio 210-$b$) may be adjusted to allow parallel transmission. For example, timing parameters for transmission from/reception to the second radio 210-$b$ may be adjusted to align with transmission/reception periods of the first radio 205-$b$.

The first radio 205-$b$, the second radio 210-$b$, a station 115, an AP 105, and/or some other network component may coordinate communication of the upcoming transmission from the first radio 205-$b$ and the upcoming transmission from the second radio 210-$b$, such as based on the determination of whether they can transmit in parallel. In some examples, coordinating communication of the upcoming transmissions 330 includes adapting transmission power of the first radio 205-$b$ and/or the second radio 210-$b$, such as a combined transmission power, based on the determination that the first radio 205-$b$ and the second radio 210-$b$ can transmit in parallel. For example, a transmission power may be reduced, such as at the first radio 205-$b$ and/or second radio 210-$b$ to meet power constraints for parallel transmission. It should be noted that the upcoming transmission from the first radio 205-$b$ and the upcoming transmission from the second radio 210-$b$ may not start and/or end at the same time, even if they can transmit in parallel. In some cases, the transmission power is determined at the start or before the first of the upcoming transmissions. Once an upcoming transmission has started transmitting, transmission power may not be able to be adjusted further until the next transmission.

In some examples, coordinating communication of the upcoming transmissions 330 includes adapting a frame size of the upcoming transmission from the second radio 210-$b$, such as based on the determination that the first radio and the second radio cannot transmit in parallel. For example, a frame size for the second radio 210-$b$ may be determined based on the timing of the upcoming transmission from the first radio 205-$b$, such as allowing transmission from the second radio 210-$b$ to complete before transmission from the first radio 205-$b$ begins. The second radio 210-$b$ may aggregate multiple Media Access Control (MAC) Protocol Data Units (MPDUs) and/or MAC Service Data Units (MSDUs) into a frame or subframe in order to reduce overhead and increase data throughput. Once aggregated, the group of MPDUs/MSDUs may be referred to as aggregated-MPDUs (A-MPDUs)/aggregated-MSDUs (A-MSDUs). The second radio 210-$b$ may determine how many MPDUs and/or MSDUs to aggregate into a frame or subframe based on the determined frame size. The second radio 210-$b$ may also adjust timing to allow for reception of signals (such as block acknowledgment (B-ACK) signals) when the first radio 205-$b$ is not receiving signals.

Similarly, if it has been determined that the first radio 205-$b$ and the second radio 210-$b$ can transmit and/or receive in parallel, frame sizes for the second radio may be adjusted accordingly. For example, a frame size for the second radio 210-$b$ may be determined so that the second radio 210-$b$ is transmitting/receiving when the first radio 205-$b$ is transmitting/receiving.

In some examples, the second radio 210-$b$ may determine whether to delay transmission 335 of the upcoming transmission from the second radio 210-*b*. For example, determining whether to delay transmission may be based on the first scheduling message 305-*a*. If the first radio 205-*a* and second radio 210-*b* can transmit in parallel, an upcoming transmission from the second radio 210-*b* may be delayed until an upcoming transmission from the first radio 205-*b* transmits. In some cases, if the first radio 205-*b* and the second radio 210-*b* cannot transmit in parallel (e.g., a combined transmission power exceeds a power threshold), an upcoming transmission from the second radio 210-*b* may be delayed until the first radio 205-*b* is no longer transmitting (e.g., receiving). Further, a time to delay transmission may be determined.

In some cases, a second scheduling message 340 may be transmitted from the second radio 210-*b*, such as to the first radio 205-*b*. The second scheduling message 340 may include a transmission power and/or a priority of the upcoming transmission from the second radio 210-*b* and/or a parallel transmission/reception capabilities of the second radio 210-*b*. In some examples, the second scheduling message 340 is in response to the first scheduling message 305-*a*. The second scheduling message 340 may be independent of the first scheduling message 305-*a*.

In some examples, the first radio 205-*b* may determine whether to delay transmission 345 of the upcoming transmission from the first radio 205-*b*. For example, determining whether to delay transmission may be based on the second scheduling message 340. If the first radio 205-*b* and second radio 210-*b* can transmit in parallel, an upcoming transmission from the first radio 205-*b* may be delayed until an upcoming transmission from the second radio 210-*b* transmits. In some cases, if the first radio 205-*b* and the second radio 210-*b* cannot transmit in parallel, an upcoming transmission from the first radio 205-*b* may be delayed until the second radio 210-*b* is no longer transmitting, or is receiving. Further, a time to delay transmission may be determined.

Figure 3C:
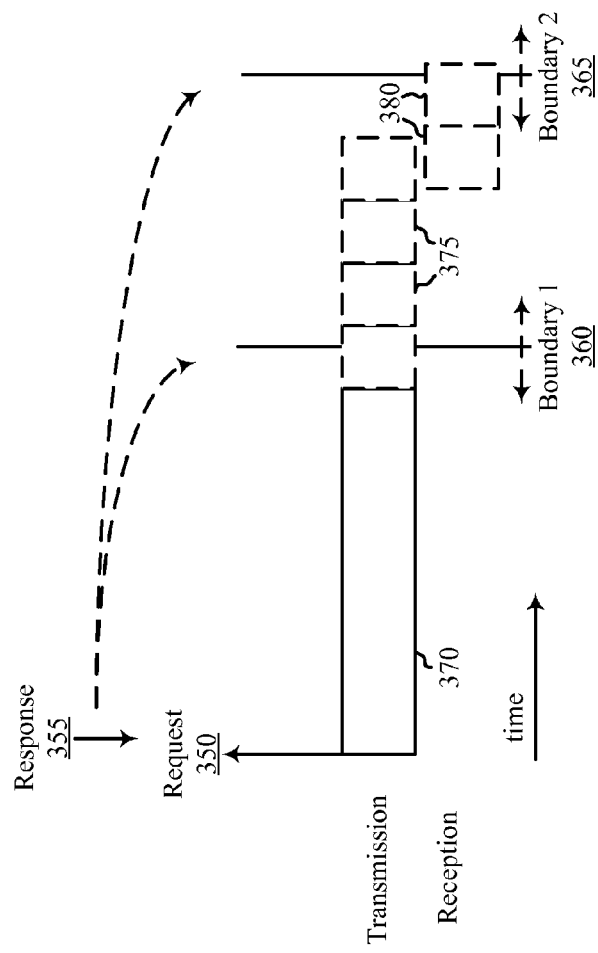
FIG. 3C illustrates an example timing diagram that may be used in a wireless communications system in accordance with various examples.

FIG. 3C shows a timing diagram 300-*b* which illustrates, according to some examples, communication within a system configured for wireless communication. FIG. 3C shows communication between two radios, such as a first radio 205 and a second radio 210 of FIG. 2, 3A, or 3B, either directly or indirectly (e.g., through an arbiter such as a communication manager, as described in more detail below).

A radio, such as the second radio 210, may issue a request 350 to another radio or to a communication manager. In some cases, the request 350 may include information relating to a current or upcoming transmission from, or reception to, the second radio 210 (e.g., a transmission power, a priority, a frequency used, a start time, an end time, a length, etc.) and/or information relating to the second radio 210 (e.g., concurrent transmission/reception capabilities, potential frequencies used, potential powers, a radio priority, default frame length, etc.).

A response 355 to the request 350 may be received at the second radio 210 from the first radio 205 and/or the communication manager. The response 355 may include information relating to a current or upcoming transmission from, or reception to, the first radio 205 (e.g., a transmission power, a priority, a frequency used, a beginning and/or end time of the transmission, a length of the transmission, etc.) and/or information relating to the first radio 205 (e.g., concurrent transmission/reception capabilities, potential frequencies used, potential powers, a radio priority, default frame length, etc.). In some cases, the response 355 includes information relating to a current or upcoming transmission from, or reception to, the first radio 205 relative to a current or upcoming transmission from, or reception to, the second radio 210 (e.g., a difference in power, a timing difference, a priority difference, etc.). In some examples, the response 355 includes information relating to the first radio 205 relative to the second radio 210 (e.g., a priority difference, concurrent transmission/reception capabilities etc.).

The response 355 may include, or may be used to determine, a boundary such as boundary 1 360 and/or boundary 2 365. In some cases, a boundary may be some or all of a timing boundary, a power boundary, a frequency boundary, and a priority boundary.

In some examples, the first radio 205 and the second radio 210 may not be capable of parallel transmission, such as indicated by, or determined using, the request 350 and/or the response 355. Boundary 1 360 may represent the start time of an interfering transmission by or to the first radio 205, or the end time of a first radio 205 idle gap. In some cases, boundary 1 360 is a transmit boundary, meaning that transmissions from the second radio 210 (and the acknowledgments to the second radio) are not permitted beyond boundary 1 360. Thus, the second radio 210 may finish transmitting before the first radio 205 begins transmitting or receiving at boundary 1 360 so as to avoid the transmission from the second radio 210 overpowering or interfering with the reception at the first radio 205. Alternatively, boundary 1 360 may represent a receive boundary, meaning that it may no longer be possible for the second radio 210 to receive transmissions after boundary 1 360, as transmissions to the second radio 210 between boundary 1 360 and boundary 2 365 may be lost due to interference from transmissions by the first radio 205 and/or interfere with reception by the first radio 205.

In some cases, transmissions from the second radio 210 may end before boundary 1 360 to avoid interference with transmissions by the first radio 210. A frame length may be determined by the second radio 210 and/or communication manager using boundary 1 360. For example, a number of MPDUs and/or MSDUs 375 may be aggregated into an A-MPDU/A-MSDU 370. The number of MPDUs/MSDUs 375 to aggregate may be determined based on boundary 1 360, such as by not aggregating more MPDUs/MSDUs 375 than would end before boundary 1 360 (as illustrated using A-MPDU/A-MSDU 370). In some cases, transmissions from the second radio 210 may begin before boundary 1 360 (e.g., around the same time that the request 350 is transmitted or the response 355 is received). The number of MPDUs/MSDUs 375 to aggregate may be determined based on the start time of the transmission by the second radio 210 and boundary 1 360. For example, the second radio may not aggregate more MPDUs/MSDUs 375 than may be possible to transmit (and receive acknowledgment of) prior to boundary 1 360 (i.e., including one more MPDU/MSDU 375 to A-MPDU/A-MSDU 370).

Boundary 2 365 may represent the end time of a transmission by the first radio 205, or when a first radio 205 idle gap will begin. In some examples, boundary 2 365 is a receive boundary, indicating when the second radio 210 may begin receiving transmissions without interference from the first radio 205. Alternatively, boundary 2 365 may be a transmit boundary, indicating when the second radio 210 is permitted to resume transmitting. In some examples, the second radio 210 may enter a sleep state between boundary 1 360 and boundary 2 365, then power up to receive or transmit again after boundary 2 365.

As discussed above, the determination of whether the first radio 205 and the second radio 210 can operate in parallel may be based at least in part on a priority assigned to each radio 205, 210. The relative priorities of the first radio 205 and the second radio 210 may be dynamically determined for different transmitting and receiving activities based on a number of relevant factors, including type of content, signal strength, transmission power, channel conditions, and other considerations. In certain examples, each radio 205, 210 may determine the priority of its current or upcoming transmission or receiving activities. Alternatively, an arbiter such as a communication manager may assign priorities to different transmission and receiving activities by each radio 205, 210. In still other examples, a single one of the radios 205, 210 may determine the priority of the transmission and receiving activities by each radio 205, 210. Additionally or alternatively, the priority assigned to each radio 205, 210 may be statically configured.

In some examples, the first radio 205 and the second radio 210 may both have upcoming transmissions. If the upcoming transmission from the second radio 210 is higher priority than the upcoming transmission from the first radio 205, the second radio 210 may size the A-MPDU/A-MSDU 370 accordingly and/or may not adjust the transmission power of the upcoming transmission. If the priority of the upcoming transmission from the second radio 210 is lower than, or equal to, the priority of the upcoming transmission from the first radio 205, the size of the A-MPDU/A-MSDU 370 may be determined so as to align with, or avoid, the transmission from the first radio 205 based on whether parallel transmissions may occur. If parallel transmissions may occur, the power of the upcoming transmission from the second radio 210 and/or the power of the upcoming transmission from the first radio 205 may be adjusted, such as reduced to meet power constraints. In some cases, whether parallel transmission may occur is based on a transmission power and/or a transmission frequency. If parallel transmission can not occur the transmission with the higher priority may be transmitted instead of the lower priority transmission.

In some examples, the first radio 205 has an upcoming reception and the second radio 210 has an upcoming transmission. If the upcoming transmission from the second radio 210 is higher priority than the upcoming reception at the first radio 205, the second radio 210 may size the A-MPDU/A-MSDU 370 accordingly and/or may not adjust the transmission power of the upcoming transmission. If the priority of the upcoming transmission from the second radio 210 is lower than, or equal to, the priority of the upcoming reception at the first radio 205, the size of the A-MPDU/A-MSDU 370 may be determined so as to avoid the reception at the first radio 205 and/or transmission power of the upcoming transmission from the second radio 210 may not be adjusted. In some cases, transmission is allowed if the transmission has a higher priority than the reception. The transmission may be allowed even if the priority is lower than the priority of the reception if the transmit power is below a threshold.

In some cases, dynamic aggregation, or determining a number of MPDUs/MSDUs 375 to combine into an A-MPDU/A-MSDU 370, is not used and/or not possible. In some examples, the first radio 205 and the second radio 210 both have upcoming transmissions. If the upcoming transmission from the second radio 210 is higher priority than the upcoming transmission from the first radio 205, the second radio 210 may transmit without adjusting the transmission power. If the priority of the upcoming transmission from the second radio 210 is lower than the priority of the upcoming transmission from the first radio 205, the second radio 210 may transmit with an adjusted transmission power if the two transmissions will overlap and concurrent transmission may occur, may transmit without adjusting transmission power if the two transmissions will not overlap, and may abort or delay transmission otherwise. If the priority of the upcoming transmission from the second radio 210 is equal to the priority of the upcoming transmission from the first radio 205, the second radio 210 may transmit with an adjusted transmission power if the two transmissions will overlap and concurrent transmission may occur, and may transmit without adjusting transmission power otherwise.

In some cases, dynamic aggregation, or determining a number of MPDUs/MSDUs 375 to combine into an A-MPDU/A-MSDU 370, is not used and/or not possible. In some examples, the first radio 205 has an upcoming reception and the second radio 210 has an upcoming transmission. If the upcoming transmission from the second radio 210 is higher priority than the upcoming reception at the first radio 205, the second radio 210, may transmit without adjusting the transmission power. If the priority of the upcoming transmission from the second radio 210 is lower than, or equal to, the priority of the upcoming reception at the first radio 205, the second radio 210 may transmit without adjusting the transmission power if the transmission and reception will not overlap, and may abort or delay transmission otherwise.

In some examples, the second radio 210 may be searching while the first radio 205 is attempting to receive, and the first radio 205 is allowed to receive. If the second radio 210 has an upcoming transmission and the first radio 205 has an upcoming reception, the first radio 205 may be allowed to receive and the second radio 210 may abort or delay its transmission if the priority of the reception at the first radio 205 is greater than the priority of the transmission from the second radio 210. If the second radio 210 has an upcoming transmission and the first radio 205 has an upcoming reception, the first radio 205 may abort reception and the second radio 210 may transmit its transmission if the priority of the reception at the first radio 205 is less than or equal to the priority of the transmission from the second radio 210. If the second radio 210 and the first radio 205 both have upcoming receptions the first radio 205 may be allowed to receive.

In some cases, if the first radio 205 is idle and the second radio 205 has an upcoming reception, the second radio 205 may be allowed to receive. If the first radio 205 has an upcoming transmission and the second radio 210 has an upcoming reception, the second radio may be allowed to receive and the transmission from first radio 205 may be aborted or delayed if the upcoming reception at the second radio 210 has higher priority than the upcoming transmission from the first radio 205. Otherwise, if the upcoming transmission from the first radio 205 is greater than, or equal to, the priority of the upcoming reception at the second radio 210, the transmission from the first radio 205 may be allowed while the reception at the second radio 210 may be aborted or delayed. If the first radio 205 and the second radio 210 both have upcoming receptions then the second radio 210 may be allowed to receive.

In some examples, when the first radio 205 is transmitting, only packet detection is disabled at the second radio 210, rather than shutting down the physical (PHY) layer. This allows existing packets being processed to finish. Further, hardware such as analog digital converters (ADC) may be shut down at the second radio 210 during transmission from the first radio 205 to save power. In some cases, if a transmission from the second radio 210 is aborted, such as due to a reception at the first radio 205, the second radio 210 may transition to listening for receptions and prepare to receive a B-ACK as it normally would.

Figure 4A:
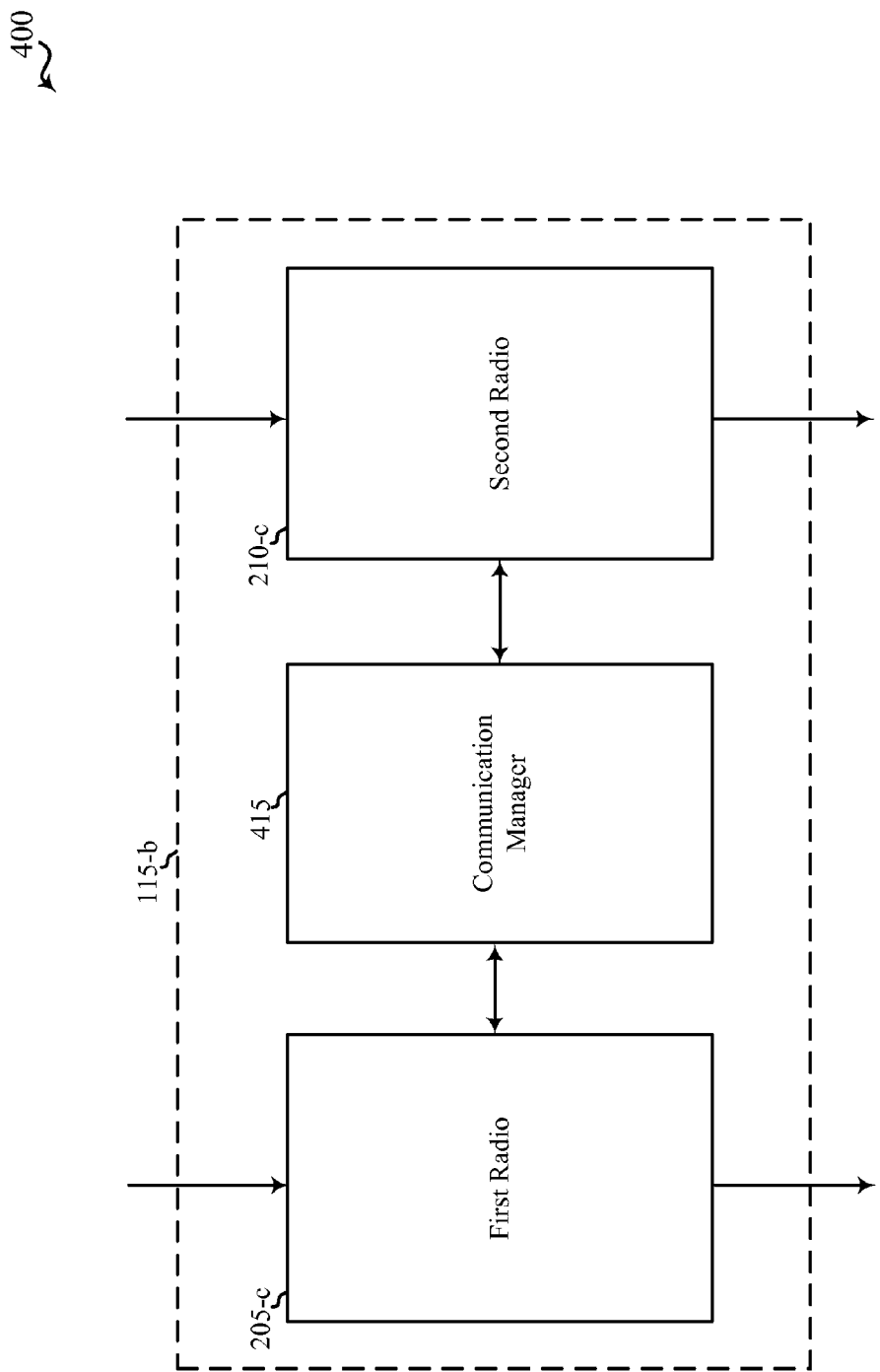
FIGS. 4A and 4B show block diagrams of examples of wireless devices that may be employed in wireless communications systems in accordance with various examples.

FIG. 4A shows a block diagram illustrating a device 400 configured for wireless communication in accordance with various examples. The device 400 may be a station 115-*b*, which may be an example of a station 115 of FIG. 1 or 2. The device 400 may be an example of an AP 105 of FIG. 1 or 2. In some examples, the device 400 is a processor. The device 400 may include a first radio 205-*c*, a communication manager 415, and/or a second radio 210-*c*. The first radio 205-*c* may be an example of a first radio 205 of FIG. 2, 3A, or 3B. The second radio 210-*c* may be an example of a second radio 210 of FIG. 2, 3A, or 3B. In some examples, the communication manager 415 may be configured to implement aspects discussed above with respect to the communication manager of FIG. 3C. In some cases, the communication manager 415 is a part of the first radio 205-*c* and/or the second radio 210-*c*. In some examples, the communication manager 415 is a separate entity from the first radio 205-*c* and/or the second radio 210-*c*. The first radio 205-*c*, communication manager 415, and/or second radio 210-*c* may include an integrated processor; they may also include an oscillator and/or a timer. Aspects of the first radio 205-*c*, the communication manager 415, and/or the second radio 210-*c* may be implemented on separate chips or on a common chip.

The first radio 205-*c* may transmit signals to and/or receive signals from non-WLAN devices 110 and/or stations 115. The first radio 205-*c* may perform operations, or parts of operations, of the system and call flow described above in FIG. 3A or 3B, including transmitting a first scheduling message 305, determining a transmission window 310, aggregating a frame 315, determining whether transmissions may occur in parallel 325, coordinating communications 330, receiving a second scheduling message 340, and/or determining whether to delay a transmission 345.

The device may include a communication manager 415. The communication manager 415 may manage communications between different RATs and/or different radios, such as the first radio 205-*c* and the second radio 210-*c*. The communication manager may perform operations, or parts of operations, of the system and call flow described above in FIG. 3A or 3B, including preparing and/or analyzing a scheduling message 305 or 340, determining a transmission window 310, aggregating a frame 315, determining whether transmissions may occur in parallel 325, coordinating communications 330, and/or determining whether to delay a transmission 335 or 345. The communication manager 415 may include a database. The database may store information relating to APs 105, stations 115, non-WLAN devices 110, the first radio 205-*c*, and/or the second radio 210-*c*.

The second radio 210-*c* may transmit signals to and/or receive signals from APs 105 and/or stations 115. The second radio 210-*c* may perform operations, or parts of operations, of the system and call flow described above in FIG. 3A or 3B, including receiving a first scheduling message 305, determining a transmission window 310, aggregating a frame 315, transmitting an aggregate frame 320, determining whether transmissions may occur in parallel 325, coordinating communications 330, determining whether to delay a transmission 335, and/or transmitting a second scheduling message 340.

Figure 4B:
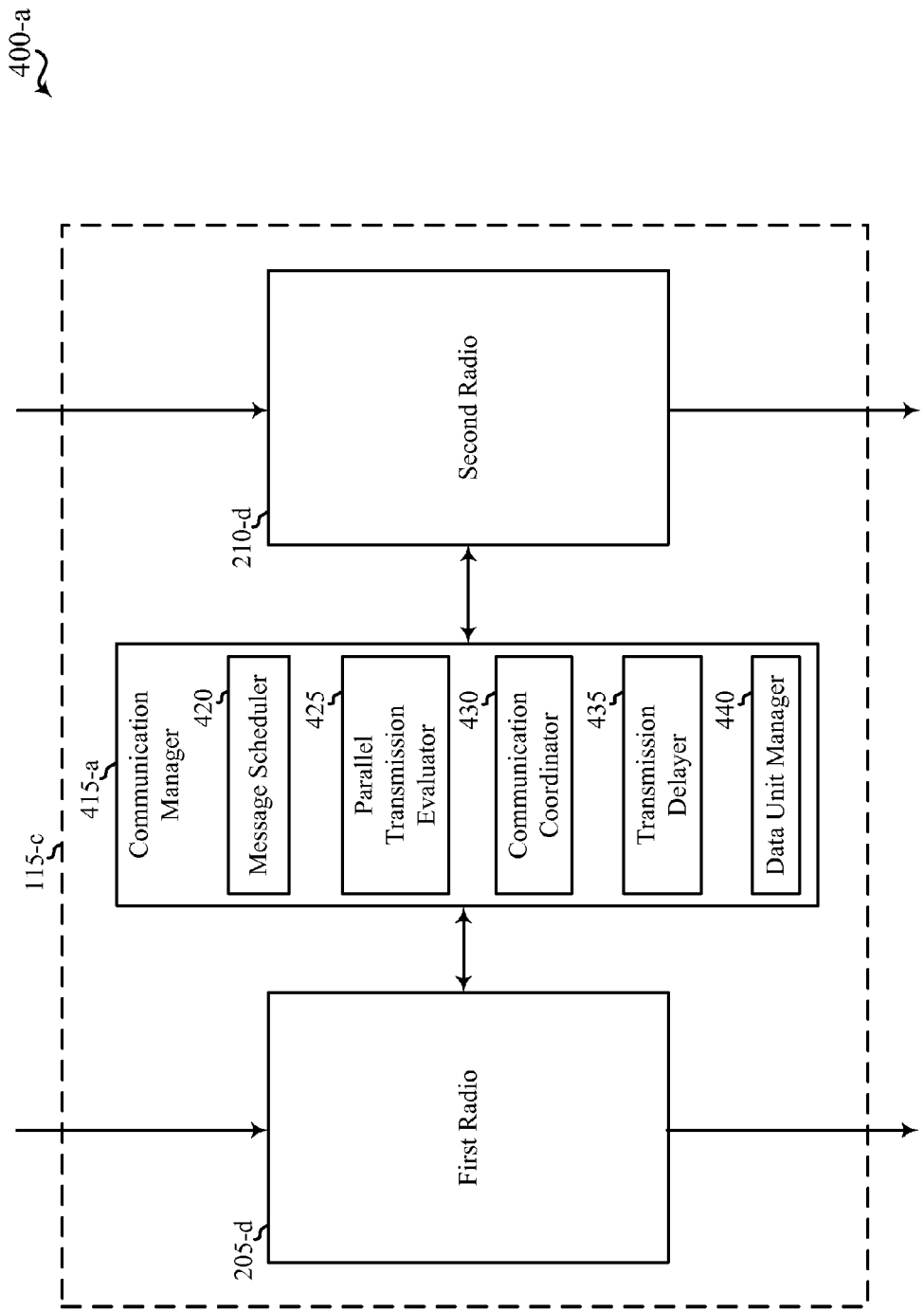

FIG. 4B shows a block diagram of a device 400-*a* configured for wireless communication in accordance with various examples. The device 400-*a* may be an example of the device 400 of FIG. 4A; and the device 400-*a* may perform the same or similar functions as described above for device 400. In some examples, the device 400-*a* is a station 115-*c*, which may include one or more aspects of the stations 115 or other mobile devices described above with reference to any or all of FIGS. 1, 2, and 4A. In some examples, the device 400-*a* is an example of an AP 105 described above with reference to any or all of FIGS. 1, 2, and 4A. The device 400-*a* may also be a processor. In some cases, the device 400-*a* includes a first radio 205-*d*, which may be an example of first radios 205 described above with reference to any or all of FIGS. 2, 3A, 3B, and 4A; and the first radio 205-*d* may perform the same or similar functions as described above for first radio 205. In some cases, the device 400-*a* includes a second radio 210-*d*, which may be an example of second radios 210 described above with reference to any or all of FIGS. 2, 3A, 3B, and 4A; and the second radio 210-*d* may perform the same or similar functions as described above for second radio 210.

In some examples, the device 400-*a* includes a communication manager 415-*a*, which may be an example of the communication manager 415 of FIG. 4A. The communication manager 415-*a* may include a message scheduler 420. The message scheduler 420 may perform operations, or parts of operations, of the system and call flow described above in FIG. 3A or 3B, such as preparing and/or analyzing scheduling messages 305 or 340, and/or determining a transmission window 310.

In some examples, the device 400-*a* includes a parallel transmission evaluator 425. The parallel transmission evaluator 425 may perform operations, or parts of operations, of the system and call flow described above in FIG. 3B, such as determining whether transmissions may occur in parallel 325.

In some examples, the device 400-*a* includes a communication coordinator 430. The communication coordinator 430 may perform operations, or parts of operations, of the system and call flow described above in FIG. 3B, such as coordinating communications 330.

In some examples, the device 400-*a* includes a transmission delayer 435. The transmission delayer 435 may perform operations, or parts of operations, of the system and call flow described above in FIG. 3B, such as determining whether to delay a transmission 335 or 345, delaying a transmission, and/or determining a time to delay a transmission.

In some examples, the device 400-*a* includes a data unit manager 440. The data unit manager 440 may perform operations, or parts of operations, of the system and call flow described above in FIG. 3A, such as determining a transmission window 310 and/or aggregating a frame 315.

According to some examples, the components of the devices 400 and/or 400-*a* are, individually or collectively, implemented with an application-specific integrated circuit (ASIC) adapted to perform some or all of the applicable functions in hardware. In other examples, the functions of device 400 and/or 400-*a* are performed by a processing unit (or core), on an one integrated circuit (IC). In other examples, other types of integrated circuits are used (e.g., Structured/Platform ASICs, field-programmable gate arrays (FPGAs), and other Semi-Custom ICs), which may be programmed in any manner known in the art. The functions of each unit may also be implemented, in whole or in part, with instructions embodied in a memory, formatted to be executed by a general or application-specific processor.

Figure 5:
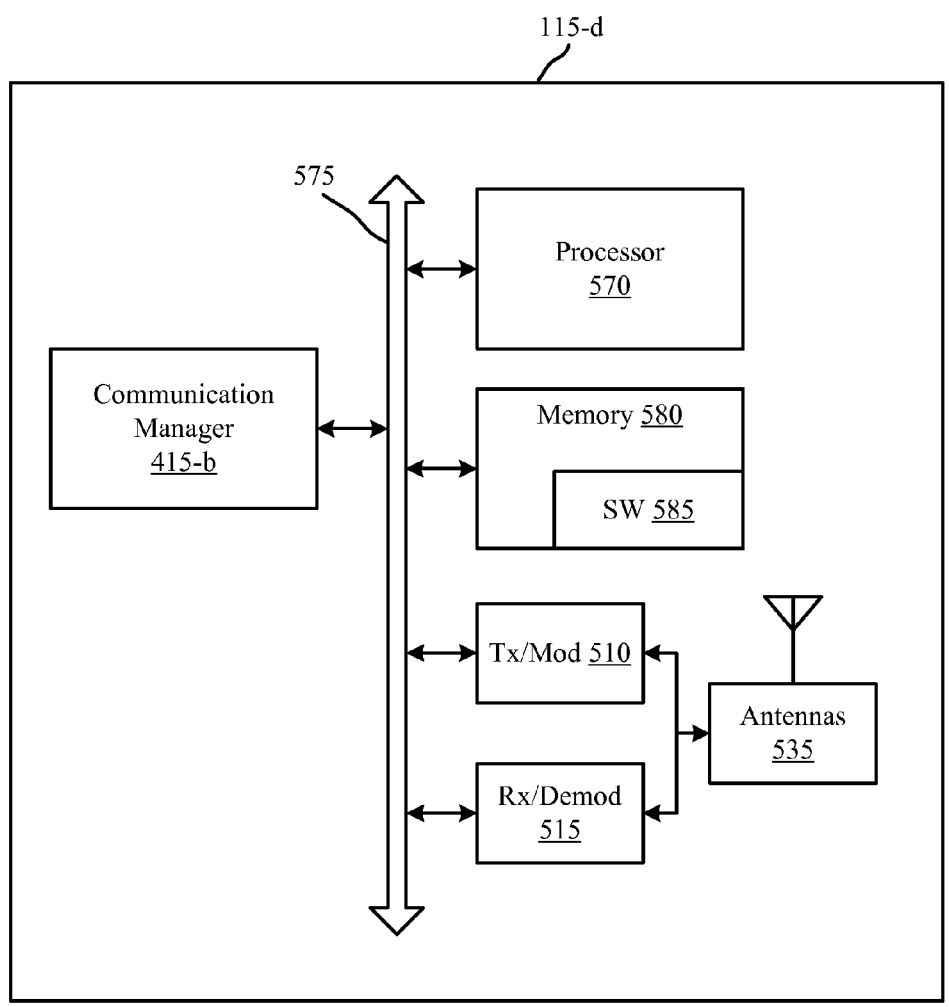
FIG. 5 shows a block diagram of a wireless device configured for wireless communication in accordance with various examples.

FIG. 5 is a block diagram 500 of a station 115-*d* configured for wireless communication, in accordance with various examples. The station 115-*d* may have any of various configurations, such as personal computers (e.g., laptop computers, netbook computers, tablet computers, etc.), cellular telephones, PDAs, smartphones, digital video recorders (DVRs), internet appliances, gaming consoles, e-readers, etc. The station 115-*d* may have an internal power supply (not shown), such as a small battery, to facilitate mobile operation. In some examples, the station 115-*d* may be an example of the stations 115 of FIGS. 1, 2, 4A, and/or 4B.

The station 115-*d* may generally include components for bi-directional voice and data communications including components for transmitting communications and components for receiving communications. The station 115-*d* may include a processor 570, a memory 580, transmitter/modulators 510, receiver/demodulators 515, and one or more antenna(s) 535, which each may communicate, directly or indirectly, with each other (e.g., via a bus 575).

The station 115-*d* may include multiple antennas 535 capable of concurrently transmitting and/or receiving multiple wireless transmissions via transmitter/modulators 510 and receiver/demodulators 515. For example, the station 115-*d* may have X antennas 535, M transmitter/modulators 510, and R receiver/demodulators 515. The transmitter/modulators 510 may be configured to transmit signals via one or more of the antennas 535 to APs 105, non-WLAN devices 110, and/or other stations 115. The transmitter/modulators 510 may include a modem configured to modulate packets and provide the modulated packets to the antennas 535 for transmission. The receiver/demodulators 515 may be configured to receive, perform RF processing, and demodulate packets received from one or more of the antennas 535. In some examples, the station 115-*d* may have one receiver/demodulator 515 for each antenna 535 (i.e., R=X), while in other examples R may be less than or greater than X. The transmitter/modulators 510 and receiver/demodulators 515 may be capable of concurrently communicating with multiple APs 105, non-WLAN devices 110, and/or stations 115 via multiple MIMO layers and/or component carriers. In some cases, at least one transmitter/modulator 510, receiver/demodulator 515, and/or antenna 535 is a part of a first radio, such as first radio 205, employing a first RAT. In some cases, at least one transmitter/modulator 510, receiver/demodulator 515, and/or antenna 535 is a part of a second radio, such as second radio 210, employing a second RAT.

According to the architecture of FIG. 5, the station 115-*d* may also include communication manager 415-*b*. By way of example, communication manager 415-*b* may be a component of the station 115-*d* in communication with some or all of the other components of the station 115-*d* via bus 575. Alternatively, functionality of the communication manager 415-*b* may be implemented as a component of the transmitter/modulators 510, the receiver/demodulators 515, as a computer program product, and/or as a controller element of the processor 570.

The memory 580 may include random access memory (RAM) and read-only memory (ROM). The memory 580 may store computer-readable, computer-executable software/firmware code 585 containing instructions that are configured to, when executed, cause the processor 570 to perform various functions described herein (e.g., determine whether transmissions may occur in parallel, coordinate communications, delay transmissions, prepare/analyze scheduling messages, etc.). Alternatively, the software/firmware code 585 may not be directly executable by the processor 570 but be configured to cause a computer (e.g., when compiled and executed) to perform functions described herein.

The processor 570 may include an intelligent hardware device, e.g., a central processing unit (CPU), a microcontroller, an application-specific integrated circuit (ASIC), etc. The station 115-*d* may include a speech encoder (not shown) configured to receive audio via a microphone, convert the audio into packets (e.g., 20 ms in length, 30 ms in length, etc.) representative of the received audio, provide the audio packets to the transmitter/modulators 510, and provide indications of whether a user is speaking.

The station 115-*d* may be configured to implement aspects discussed above with respect to stations 115 of FIGS. 1, 2, 4A, and/or 4B, or first radios 205 and/or second radios 210 of FIGS. 2, 3A, 3B, 4A, and/or 4B, and may not be repeated here for the sake of brevity. Thus, communication manager 415-*b* may include the modules and functionality described above with reference to communication manager 415 of FIG. 4A and/or communication manager 415-*a* of FIG. 4B. Additionally or alternatively, communication manager 415-*b* may perform the method 600 described with reference to FIG. 6, the method 700 described with reference to FIG. 7, and/or the method 800 described with reference to FIG. 8.

Figure 6:
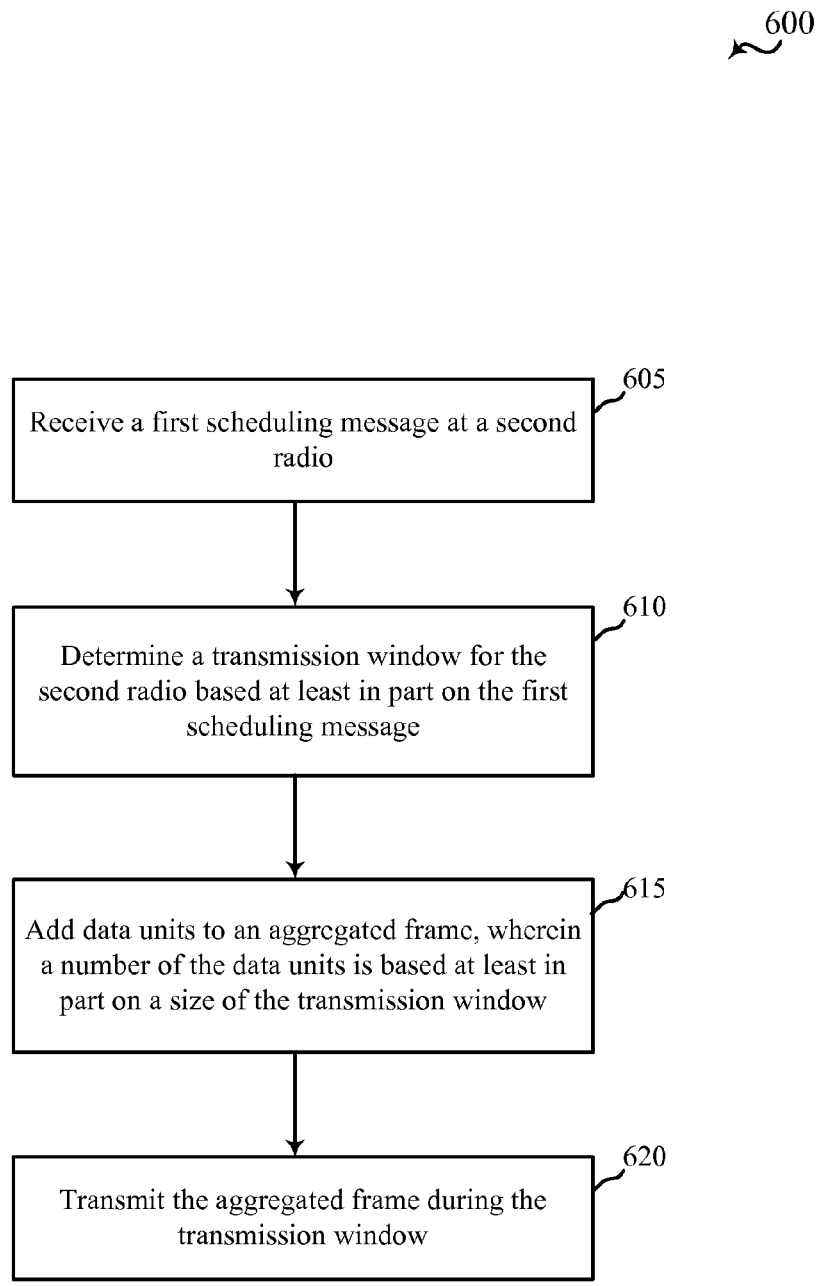
FIG. 6 is a flow diagram that depicts an example of a method of wireless communication in accordance with various examples.

FIG. 6 shows a flowchart illustrating a method 600 of wireless communication in accordance with various examples. The method 600 may be implemented using, for example, the devices, systems, and call flow(s) 100, 200, 300, 300-*a*, 300-*b*, 400, 400-*a*, and 500 of FIGS. 1, 2, 3A, 3B, 3C, 4A, 4B, and 5.

At block 605, a second radio of the station may receive a first scheduling message from a first radio of the station. The two radios may employ different RATs. In certain examples, the functions of block 605 may be performed by the second radio 210-*c* or communication manager 415 of FIG. 4A, and/or the message scheduler 420 of FIG. 4B. The first scheduling message may be transmitted to the second radio 210-*c* over, for example, an application programming interference (API) or other connection between the radios 210. The first scheduling message may include details about a planned first transmission over the first radio, such as timing information, transmission power, relative priority, and/or other information about the first transmission that may allow the second radio 210-*c* to determine whether collisions with a second transmission by the second radio 210-*c* are possible, and in the event that a potential scheduling collision exists, how to reduce or mitigate cross-interference between the two radios.

At block 610, the station 115 and/or AP 105 may determine whether the first radio and a second radio employing a second RAT can transmit in parallel based in part on the first scheduling message. For example, the determination of whether the first radio and the second radio can transmit in parallel may be based on the relative importance (i.e., priority) of a first transmission by the first radio in comparison with a second transmission by the second radio. For example, if the first transmission is considered to have a higher priority than the second transmission, the second radio may not be permitted to transmit the second transmission while the first radio is transmitting the first transmission. Thus, the second radio may have to delay or truncate the second transmission to avoid transmitting in parallel with the first transmission. The same principles may apply in reverse. On the other hand, if each of the transmissions is assigned a priority lower than a threshold, or if interference from a lower-priority transmission is unlikely to interfere with a higher-priority transmission (e.g., due to range considerations, etc.), parallel transmission by the two radios may be permissible. In certain examples, the functions of block 610 may be performed by the communication manager 415 of FIG. 4A, and/or the parallel transmission evaluator 425 of FIG. 4B. In some examples, determining whether the first radio and the second radio can transmit in parallel may include identifying a transmission window for the second radio. The transmission window may be derived directly from the first scheduling message and/or based on a receive window derived from the first scheduling message.

At block 615, the station 115 and/or AP 105 may coordinate the first transmission on the first radio and a second transmission on the second radio based on the determination. In certain examples, the functions of block 615 may be performed by the communication manager 415 of FIG. 4A, and/or the communication coordinator 430 of FIG. 4B.

Figure 7:
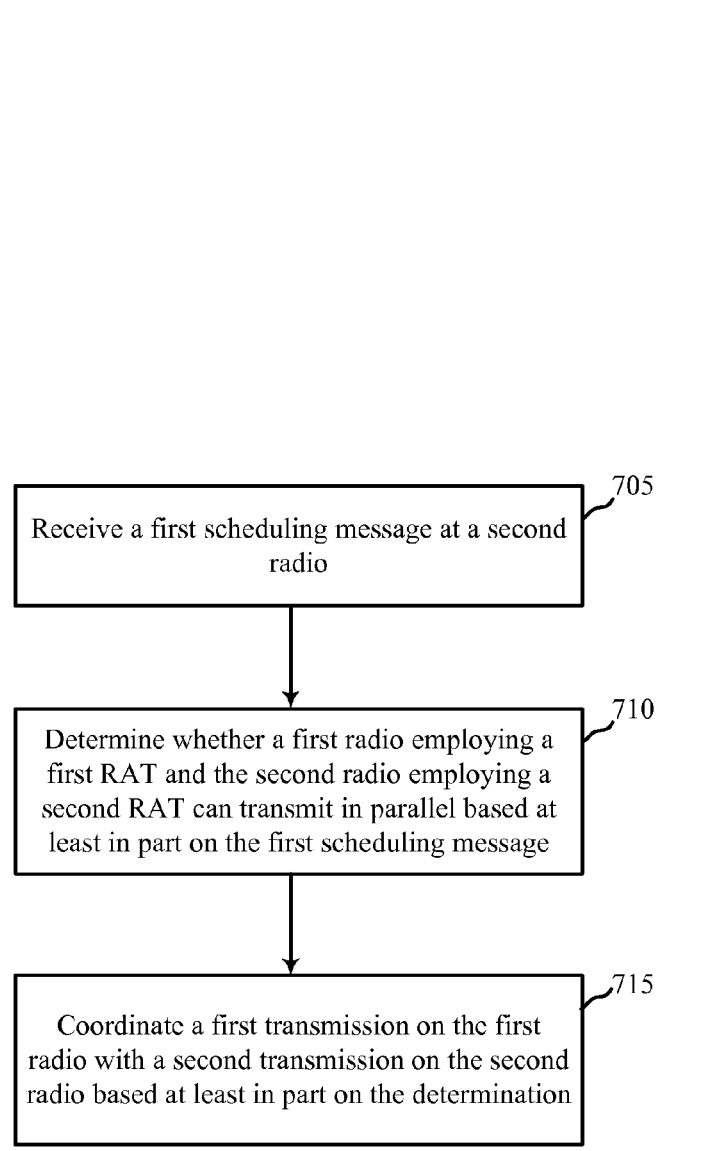
FIG. 7 is a flow diagram that depicts an example of a method of wireless communication in accordance with various examples.

FIG. 7 shows a flowchart illustrating a method 700 of wireless communication in accordance with various examples. The method 700 may be implemented using, for example, the devices, systems, and call flow(s) 100, 200, 300, 300-a, 300-b, 400, 400-a, and 500 of FIGS. 1, 2, 3A, 3B, 3C, 4A, 4B, and 5.

At block 705, a second radio of the station may receive a first scheduling message. The station may include the second radio and a first radio, and the two radios may employ different RATs. In certain examples, the functions of block 705 may be performed by the second radio 210-c or communication manager 415 of FIG. 4A, and/or the message scheduler 420 of FIG. 4B. The first scheduling message may be transmitted to the second radio 210-c over, for example, an application programming interference (API) or other connection between the radios 210. The first scheduling message may include details about a planned first transmission over the first radio, such as timing information, transmission power, relative priority, and/or other information about the first transmission that may allow the second radio 210-c to determine whether collisions with a second transmission by the second radio 210-c are possible, and in the event that a potential scheduling collision exists, how to reduce or mitigate cross-interference between the two radios.

At block 710, the station 115 and/or AP 105 may determine whether a first radio employing a first RAT and the second radio employing a second RAT can transmit in parallel based at least in part on the first scheduling message. For example, the determination of whether the first radio and the second radio can transmit in parallel may be based on the relative importance (i.e., priority) of a first transmission by the first radio in comparison with a second transmission by the second radio. For example, if the first transmission is considered to have a higher priority than the second transmission, the second radio may not be permitted to transmit the second transmission while the first radio is transmitting the first transmission. Thus, the second radio may have to delay or truncate the second transmission to avoid transmitting in parallel with the first transmission. The same principles may apply in reverse. On the other hand, if each of the transmissions is assigned a priority lower than a threshold, or if interference from a lower-priority transmission is unlikely to interfere with a higher-priority transmission (e.g., due to range considerations, etc.), parallel transmission by the two radios may be permissible. In certain examples, the functions of block 710 may be performed by the communication manager 415 of FIG. 4A, and/or the parallel transmission evaluator 425 of FIG. 4B.

At block 715, the station 115 and/or AP 105 may coordinate a first transmission on the first radio with a second transmission on the second radio based at least in part on the determination. In certain examples, the functions of block 715 may be performed by the communication manager 415 of FIG. 4A, and/or the communication coordinator 430 of FIG. 4B.

Figure 8:
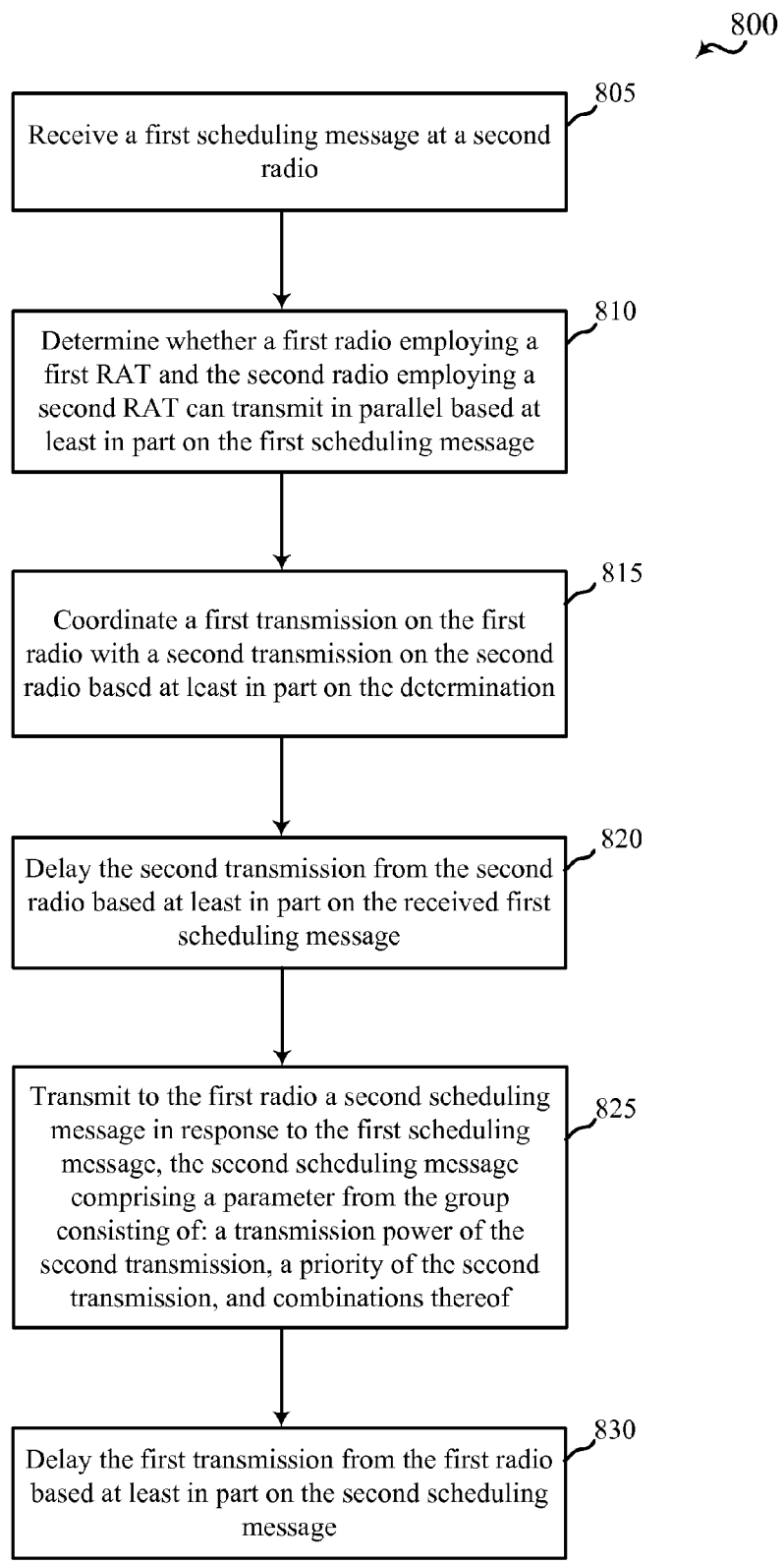
FIG. 8 is a flow diagram that depicts an example of a method of wireless communication in accordance with various examples.

FIG. 8 shows a flowchart illustrating a method 800 for wireless communication in accordance with various examples. The method 800 may be implemented using, for example, the devices, systems, and call flow(s) 100, 200, 300, 300-a, 300-b, 400, 400-a, and 500 of FIGS. 1, 2, 3A, 3B, 3C, 4A, 4B, and 5.

At block 805, the a second radio of the station 115 may receive a first scheduling message. In certain examples, the functions of block 805 may be performed by the second radio 210-c or communication manager 415 of FIG. 4A, and/or the message scheduler 420 of FIG. 4B.

At block 810, the station 115 and/or AP 105 may determine whether a first radio employing a first RAT and the second radio employing a second RAT can transmit in parallel based at least in part on the first scheduling message. In certain examples, the functions of block 810 may be performed by the communication manager 415 of FIG. 4A, and/or the parallel transmission evaluator 425 of FIG. 4B.

At block 815, the station 115 and/or AP 105 may coordinate a first transmission on the first radio with a second transmission on the second radio based at least in part on the determination. In certain examples, the functions of block 815 may be performed by the communication manager 415 of FIG. 4A, and/or the communication coordinator 430 of FIG. 4B.

At block 820, the station 115 and/or AP 105 may delay the second transmission from the second radio based at least in part on the received first scheduling message. In certain examples, the functions of block 820 may be performed by the communication manager 415 of FIG. 4A, and/or the transmission delayer 435 of FIG. 4B.

At block 825, the station 115 may transmit to the first radio a second scheduling message in response to the first scheduling message, the second scheduling message including a parameter from the group consisting of: a transmission power of the second transmission, a priority of the second transmission, and combinations thereof. In certain examples, the functions of block 825 may be performed by the communication manager 415 of FIG. 4A, and/or the message scheduler 420 of FIG. 4B.

At block 830, the station 115 and/or AP 105 may delay the first transmission from the first radio based at least in part on the second scheduling message. In certain examples, the functions of block 830 may be performed by the communication manager 415 of FIG. 4A, and/or the transmission delayer 435 of FIG. 4B.

It will be apparent to those skilled in the art that the methods 600, 700, and 800 are but example implementations of the tools and techniques described herein. The methods 600, 700, and 800 may be rearranged or otherwise modified such that other implementations are possible.

The detailed description set forth above in connection with the appended drawings describes exemplary examples and does not represent the only examples that may be implemented or that are within the scope of the claims. The term "exemplary" used throughout this description means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of [at least one of A, B, or C] means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, electrically erasable programmable read only memory (EEPROM), compact disk (CD) ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication with a device comprising a first radio employing a first radio access technology (RAT) collocated with a second radio employing a second RAT, comprising:
    receiving a first scheduling message at the second radio, wherein the first scheduling message includes information relating to a first transmission power of an upcoming first transmission from the first radio;
    determining at the second radio, whether the first radio and the second radio can transmit in parallel based at least in part on the a comparison of a total transmission power to a power threshold to determine whether the total transmission power satisfies the power threshold, wherein the total transmission power is based on the first transmission power of the upcoming first transmission from the first radio and a second transmission power of an upcoming second transmission from the second radio;
    upon determining that the total transmission power does not satisfy the power threshold, adjusting at the second radio, the second transmission power of the upcoming second transmission;
    determining a transmission window for the second radio based at least in part on the adjusted second transmission power of the upcoming second transmission and whether the total of the adjusted second transmission power of the upcoming second transmission and the first transmission power of the upcoming first transmission satisfies the power threshold;
    adding data units to an aggregated frame, wherein a number of the data units is based at least in part on a size of the transmission window;
    adjusting the transmission window to align the upcoming second transmission from the second radio with the upcoming first transmission from the first radio, the upcoming second transmission being transmitted using the adjusted second transmission power; and
    transmitting the aggregated frame during the adjusted transmission window.

2. The method of claim 1, wherein the data units comprise a unit from the group consisting of:
    a media access control (MAC) protocol data unit (MPDU), a MAC service data unit (MSDU), a filler data unit, and combinations thereof.

3. The method of claim 1, wherein the aggregated frame comprises a frame from the group consisting of:
    an aggregated media access control (MAC) protocol data unit (A-MPDU), an aggregated MAC service data units (A-MSDU), and combinations thereof.

4. The method of claim 1, wherein adding the data units to the aggregated frame is further based on a parameter from the group consisting of:
    a size of the data units, a modulation rate, and combinations thereof.

5. A method for wireless communication with a device comprising a first radio employing a first radio access technology (RAT) collocated with a second radio employing a second RAT, comprising:

receiving a first scheduling message at the second radio, wherein the first scheduling message includes information relating to a first transmission power of an upcoming first transmission from the first radio;

determining at the second radio, whether the first radio and the second radio can transmit in parallel based at least in part on the a comparison of a combined total transmission power to a power threshold to determine whether the total transmission power satisfies the power threshold, wherein the total transmission power is based on the first transmission power of the upcoming first transmission from the first radio and a second transmission power of an upcoming second transmission from the second radio;

upon determining that the total transmission power does not satisfy the power threshold, adjusting at the second radio, the second transmission power of the upcoming second transmission;

coordinating a first transmission on the first radio with a second transmission on the second radio based at least in part on the adjusted second transmission power of the upcoming second transmission and whether the total of the adjusted second transmission power of the upcoming second transmission and the first transmission power of the upcoming first transmission satisfies the power threshold; and adjusting transmission parameters at the first radio and the second radio to align the upcoming second transmission from the second radio with the upcoming first transmission from the first radio in response to determining that the first radio and the second radio can transmit in parallel, the upcoming second transmission being transmitted using the adjusted transmission parameters.

6. The method of claim 5, wherein coordinating the first transmission on the first radio with the second transmission on the second radio comprises:

adapting a transmission power in response to determining that the first radio and the second radio can transmit in parallel, wherein the power is one of the group consisting of: a transmission power of the first radio, a transmission power of the second radio, and combinations thereof.

7. The method of claim 6, wherein adapting the transmission power comprises:

reducing the transmission power to meet a power constraint for parallel transmission.

8. The method of claim 5, wherein coordinating the first transmission on the first radio with the second transmission on the second radio comprises:

adapting a frame size of the second transmission in response to determining that the first radio and the second radio cannot transmit in parallel.

9. The method of claim 5, wherein coordinating the first transmission on the first radio with the second transmission on the second radio comprises:

delaying the second transmission from the second radio based at least in part on the received first scheduling message.

10. The method of claim 5, wherein the determination is based at least in part on a relative priority of the first transmission with respect to the second transmission.

11. The method of claim 5, wherein the determination is based at least in part on a transmission power, wherein the transmission power is one of the group consisting of: the first radio, the second radio, and combinations thereof.

12. The method of claim 5, wherein the first scheduling message comprises a parameter from the group consisting of:

timing information for the first transmission, a priority of the first transmission, a transmission power of the first transmission, and combinations thereof.

13. The method of claim 5, further comprising:

transmitting to the first radio a second scheduling message, the second scheduling message comprising a parameter from the group consisting of: a transmission power of the second transmission, a priority of the second transmission, and combinations thereof.

14. The method of claim 13, wherein coordinating the first transmission on the first radio with the second transmission on the second radio comprises:

delaying the first transmission from the first radio based at least in part on the second scheduling message.

15. The method of claim 5, wherein coordinating the first transmission on the first radio with the second transmission on the second radio comprises:

refraining from transmitting the second transmission from the second radio in response to receiving the first scheduling message at the second radio prior to an expiration of a counter at the second radio.

16. The method of claim 5, wherein the first radio comprises a Bluetooth radio and the second radio comprises a wireless local area network (WLAN) radio.

17. An apparatus for wireless communication comprising a first radio employing a first radio access technology (RAT) collocated with a second radio employing a second RAT, the apparatus comprising:

means for receiving a first scheduling message at the second radio, wherein the first scheduling message includes information relating to a first transmission power of an upcoming first transmission from the first radio;

means for determining at the second radio, whether the first radio and the second radio can transmit in parallel based at least in part on the a comparison of a total transmission power to a power threshold to determine whether the total transmission power satisfies the power threshold, wherein the total transmission power is based on the first transmission power of the upcoming first transmission from the first radio and a second transmission power of an upcoming second transmission from the second radio;

upon determining that the total transmission power does not satisfy the power threshold, means for adjusting at the second radio, the second transmission power of the upcoming second transmission;

means for coordinating a first transmission on the first radio with a second transmission on the second radio based at least in part on the adjusted second transmission power of the upcoming second transmission and whether the total of the adjusted second transmission power of the upcoming second transmission and the first transmission power of the upcoming first transmission satisfies the power threshold; and means for adjusting transmission parameters at the first radio and the second radio to align the upcoming second transmission from the second radio with the upcoming first transmission from the first radio in response to determining that the first radio and the second radio can transmit in parallel, the upcoming second transmission being transmitted using the adjusted transmission parameters.

18. The apparatus of claim 17, wherein the means for coordinating the first transmission on the first radio with the second transmission on the second radio comprises:
  means for adapting a transmission power in response to determining that the first radio and the second radio can transmit in parallel, wherein the transmission power is one of the group consisting of: a transmission power of the first radio, a transmission power of the second radio, and combinations thereof.

19. The apparatus of claim 18, wherein the means for adapting the transmission power comprises:
  means for reducing the transmission power to meet a power constraint for parallel transmission.

20. The apparatus of claim 17, wherein the means for coordinating the first transmission on the first radio with the second transmission on the second radio comprises:
  means for adapting a frame size of the second transmission in response to determining that the first radio and the second radio cannot transmit in parallel.

21. The apparatus of claim 17, wherein the means for coordinating the first transmission on the first radio with the second transmission on the second radio comprises:
  means for delaying the second transmission from the second radio based at least in part on the received first scheduling message.

22. The apparatus of claim 17, further comprising:
  means for transmitting, to the first radio, a second scheduling message, the second scheduling message comprising a parameter from the group consisting of: a transmission power of the second transmission, a priority of the second transmission, and combinations thereof.

23. The apparatus of claim 22, wherein the means for coordinating the first transmission on the first radio with the second transmission on the second radio comprises:
  means for delaying the first transmission from the first radio based at least in part on the second scheduling message.

24. The apparatus of claim 17, wherein the means for coordinating the first transmission on the first radio with the second transmission on the second radio comprises:
  means for refraining from transmitting the second transmission from the second radio in response to receiving the first scheduling message at the second radio prior to an expiration of a counter at the second radio.

25. An apparatus for wireless communication comprising:
  a first radio employing a first radio access technology (RAT);
  a second radio employing a second RAT to receive a first scheduling message, wherein the second radio is collocated with the first radio, wherein the first scheduling message includes information relating to a first transmission power of an upcoming first transmission from the first radio; and
  a communication manager to:
    determine whether the first radio and the second radio can transmit in parallel based at least in part on the a comparison of a total transmission power to a power threshold to determine whether the total transmission power satisfies the power threshold, wherein the total transmission power is based on the first transmission power of the upcoming first transmission from the first radio and a second transmission power of an upcoming second transmission from the second radio;
    upon determining that the total transmission power does not satisfy the power threshold, adjust at the second radio, the second transmission power of the upcoming second transmission;
    coordinate a first transmission on the first radio with a second transmission on the second radio based at least in part on the adjusted second transmission power of the upcoming second transmission and whether the total of the adjusted second transmission power of the upcoming second transmission and the first transmission power of the upcoming first transmission satisfies the power threshold; and
    adjust transmission parameters at the first radio and the second radio to align the upcoming second transmission from the second radio with the upcoming first transmission from the first radio in response to determining that the first radio and the second radio can transmit in parallel, the upcoming second transmission being transmitted using the adjusted transmission parameters.

26. The apparatus of claim 25, wherein coordinating the first transmission on the first radio with the second transmission on the second radio comprises adapting a transmission power in response to determining that the first radio and the second radio can transmit in parallel, wherein the transmission power is selected from the group consisting of:
  a transmission power, a frame size, and combinations thereof.

27. The apparatus of claim 25, wherein coordinating the first transmission on the first radio with the second transmission on the second radio comprises:
  delaying the second transmission from the second radio based at least in part on the received first scheduling message.

28. The apparatus of claim 25, wherein the communication manager is further to transmit to the first radio a second scheduling message, the second scheduling message comprising a parameter from the group consisting of:
  a transmission power of the second transmission, a priority of the second transmission, and combinations thereof.

29. The apparatus of claim 28, wherein coordinating the first transmission on the first radio with the second transmission on the second radio comprises:
  delaying the first transmission from the first radio based at least in part on the received second scheduling message.

30. The apparatus of claim 25, wherein coordinating the first transmission on the first radio with the second transmission on the second radio comprises:
  refraining from transmitting the second transmission from the second radio in response to receiving the first scheduling message at the second radio prior to an expiration of a counter at the second radio.

* * * * *